2,930,669

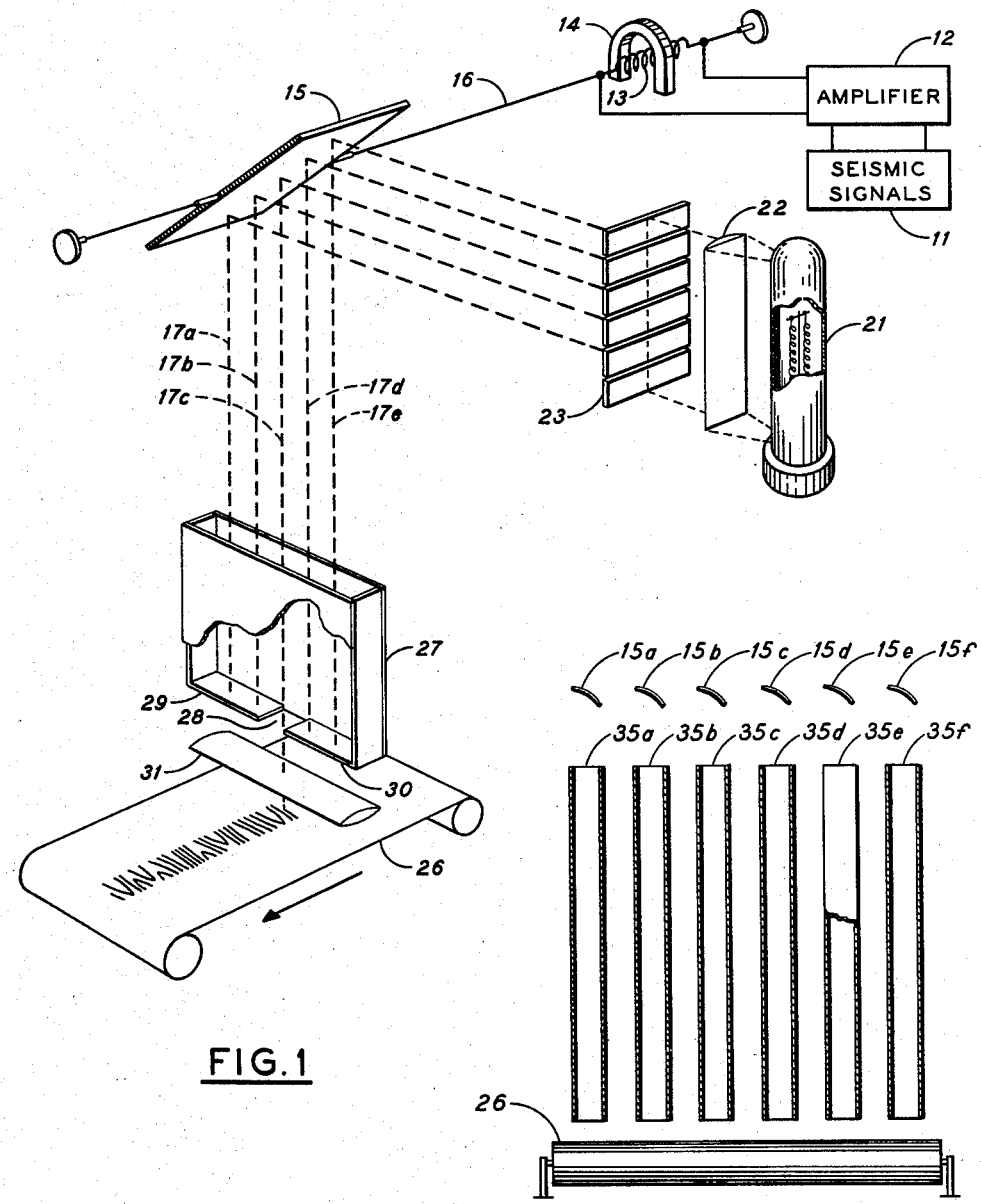

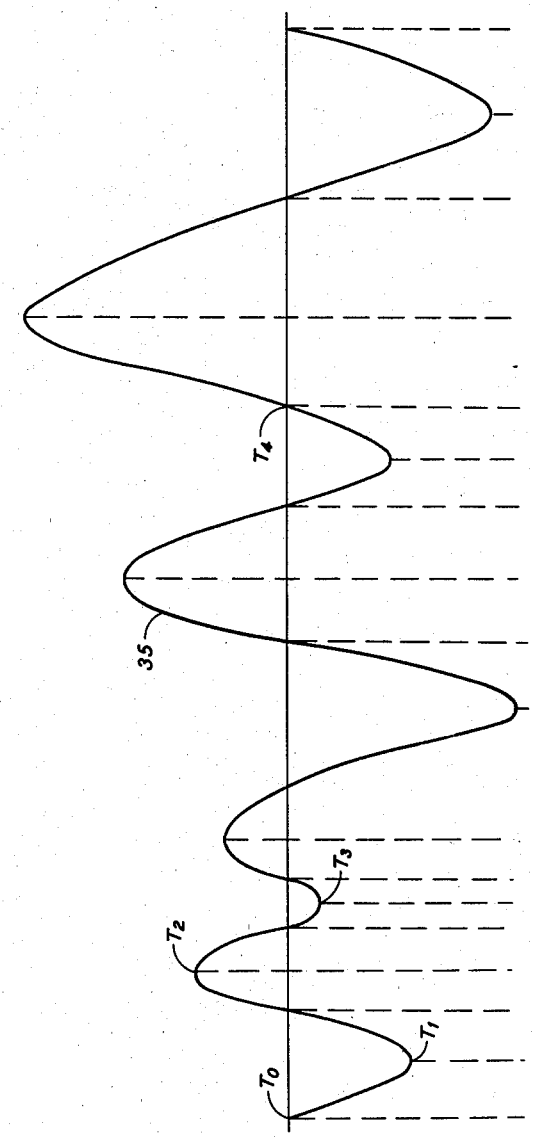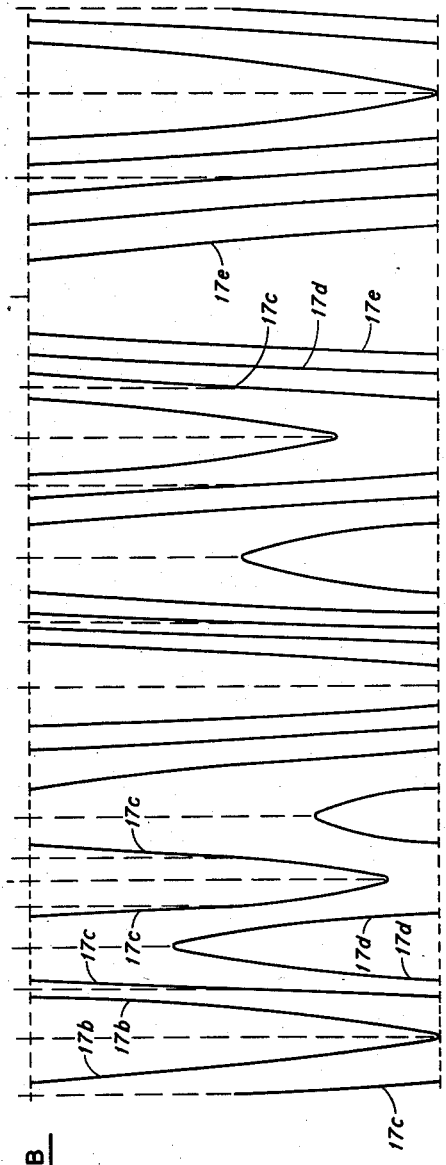

SEISMIC DATA DISPLAY

Joseph C. R. Licklider, Arlington, Mass., assignor to California Research Corporation, San Francisco, Calif., a corporation of Delaware Application October 25, 1956, Serial No. 618,666

1 Claim. (Cl. 346—109)

The present invention relates in general to seismic prospecting and relates more specifically to methods and apparatus for displaying or presenting the data obtained in such prospecting.

In seismic prospecting, a charge of explosives is detonated in the earth, and energy from the explosion is detected by one or more seismic detectors spaced some distance from the explosion point. The outputs of the seismic detectors are then recorded, usually as side-by-side traces on some recording medium, such as an oscillographic camera or a magnetic recording device. In the conventional seismic record, the traces are presented with amplitudes varying as a function of time, and an effort is made to line up or "pick" peaks common to two or more traces, indicative of the receipt by the different detectors of energy from a common reflecting horizon.

The customary presentation of seismic data represents approximately a 10-decibel or 3:1 range in amplitude. This limited amplitude range is the result of the small individual track widths which may be used in the display without unnecessarily increasing the size of the display. The seismic recording instruments, and in particular the magnetic tape utilized for recording the signals, are capable of handling at least a 30-db amplitude range, so that in the above-mentioned practice, approximately 20 db of potential amplitude range is lost. In practice, this 20-db range loss appears primarily in the loss of the finer detail or character of the seismic signals. It is agreed among geophysicists that it would be highly desirable, for some purposes, to have more information concerning the low-amplitude signals, the phase breaks, and the character of the higher amplitude signals, and these are just the features which are eliminated or lost in the low-amplitude-range recording conventionally used.

One solution to this problem is to increase the total size of the display by enlarging the size of the individual traces on the display, but in practice the useful total size of the display is limited by the size of the central field of vision of the eye. Additionally, some geophysicists believe that it is difficult to detect alignments of events having steep moveouts when the traces are presented in large amplitude. An additional solution to this display problem is to reduce the number of traces presented, while increasing the amplitudes of the remaining traces, but this appears undesirable, since it actually results in a reduction of the amount of information presented, even though the amplitude of the information that is presented is increased.

One of the methods proposed for displaying seismic signals to increase the amount of information displayed on a given size presentation is to utilize a plurality of spaced record traces corresponding to each detector signal. In this presentation, the middle trace is made darker than the adjacent traces and the resultant track thus comprises a plurality of spaced traces having amplitudes corresponding to the amplitude of the seismic detector signal. This system is effective in increasing the amount of information presented, but it is not completely satisfactory for display purposes, owing to the fact that at any instant on the record each track comprises a plurality of identical, vertically displaced traces, which tends to obscure or confuse the information present in the signal.

Broadly, the present invention contemplates methods and apparatus for displaying seismic signals in which the amplitudes of the displayed signals are effectively increased without increasing the actual size of the display or the number of tracks presented in the display. This effect is accomplished by "telescoping" the amplitude of each seismic detector signal into a much smaller space, thus permitting a much larger amplitude range to be viewed within the same size of presentation and without overlapping. This telescopic effect is produced by creating a plurality of images of each seismic detector signal for each record trace, with each of the individual images having a different and adjacent or sequential range of amplitude, but each of the images also being displayed on the same track of the record. In effect, the seismic detector signal is divided up into a plurality of amplitude ranges, with one beam or image for each such range, but with each beam or image displayed on the same width of track.

In one form of the present invention, the multiple, sequential images are created by focusing a plurality of separate beams of light on a galvanometer which has an excursion considerably greater than the width of the ultimate display track. Each beam of light corresponds to a given amplitude range of the seismic detector signal, and the galvanometer is so disposed with respect to the recording medium that only one beam of light traverses the seismic record at any instant. Thus, one image, corresponding to a given amplitude range, is traced across the width of the seismic track, say, from bottom to top, and as this image goes beyond the top of the seismic track, indicating that the signal amplitude has exceeded the given amplitude range, the next image, corresponding to one of the adjacent amplitude ranges, starts at the bottom of the track to create an additional trace.

Each seismic image is thus traced out by a plurality of traces to produce a resultant record in which each signal is effectively amplified by a factor corresponding to the number of images used for each signal. The number of images used will depend on the total amplitude range of the signal to be analyzed and on the degree of complexity of the equipment which can be tolerated, but, in general, a wide latitude is permitted without departing from the spirit of the invention. Preferably, the number of images is an odd one, so that the display is symmetrical about the center image.

In an alternate form of the invention, the different images can be produced by separate galvanometers having a common energizing signal supplied thereto and having adjacent, sequential excursions corresponding to the different amplitude ranges of the signal. Similarly, the display may be produced one track at a time, but preferably, a plurality of channels or tracks are utilized simultaneously, with each channel containing a display corresponding to a given seismic detector signal.

The type of presentation of the present invention may be thought of as a cut-shift process, because at any time at which the amplitude of an individual trace reaches a predetermined limit of excursion, this trace is clipped or cut and effectively shifted down or up and begun over again by the adjacent image at the bottom or top limit. The record for each signal is contained within the same width track utilized for a conventional presentation of a single trace so that the over-all size of the presentation will remain substantially the same.

In the display of the present invention, there is, at any instant of time, only one trace present, thus eliminating the confusion which may result from displays having a plurality of traces thereon simultaneously. The display of the present invention is particularly effective in producing an enlargment or amplification of the low-amplitude portions of the seismic detector signal, which portions, as indicated above, are those which are normally reduced or obscured in conventional seismic recording.

Objects and advantages of the present invention will be further apparent from the following description when read in connection with the accompanying drawings, in which:

Fig. 1 diagrammatically and schematically illustrates apparatus for carrying out one form of the present invention;

Fig. 2A is a graph illustrating a portion of a representative seismic detector signal;

Fig. 2B is a graph illustrating the type of display produced by the present invention corresponding to the portion of the seismic detector signal shown in Fig. 2A; and Fig. 3 illustrates apparatus for applying the present invention to the simultaneous presentation of a plurality of channels of seismic information.

Referring to the drawing by character of reference, reference character 11 designates a source of seismic detector signals to be displayed. Source 11 may be a seismic detector, in which case the seismic detector signals are supplied directly to the display apparatus of the present invention. Alternatively, source 11 may be a reproducible recording medium such as a magnetic tape recorder, on which the original seismic detector signals have been recorded and from which the signals may be reproduced repeatedly and at will.

The seismic detector signal from source 11 is supplied through an amplifier 12 to the actuating coil 13 of a recording galvanometer. As is well known in the art, a moving coil type galvanometer comprises, in addition to coil 13, a magnet 14 and a movable galvanometer mirror 15 which is rotated on a suspending wire 16 in response to the interaction between magnet 14 and variations in the current flow through coil 13. Mirror 15 has impinging thereon a plurality of separate beams of light produced by a light source 21 through a condensing lens 22 and a multiple slit grating 23. As will be readily appreciated from the drawing, the light from source 21 is condensed into a thin sheet by condensing lens 22 and then broken up into a plurality of individual beams by multiple slit grating 23, so that a plurality of beams of light, represented by the dotted lines, impinge on mirror 15.

The number of such individual beams used may vary in dependence upon the degree of telescoping desired on the final record. In the illustrated embodiment, five such beams have been illustrated. In general, the number of such beams should be an odd number. These five beams, identified as 17a, 17b, 17c, 17d, and 17e, are reflected from mirror 15 toward the recording medium which may be in the form of a reel of photographic paper 26. A suitable device is provided between mirror 15 and photographic paper 26 for controlling the impingement of the reflected light on the photographic paper. In the embodiment illustrated in Fig. 1, this device is in the form of a masking box 27 having an open end into which the reflected light beams are directed and having at the other end a slit or opening 28 defined by a pair of masking plates 29 and 30. Opening 28 has a width corresponding to the desired width of the track on film 26.

Similarly, the spacings between beams 17a through 17e in masking box 27 correspond to the width of opening 28, so that only one of these beams passes through opening 28 at any one time. With the galvanometer equipment in the intermediate or de-energized position, light beams 17a through 17e have the positions shown in Fig. 1, with beam 17c centered in the middle of opening 28 and impinging on film 26 through a condensing lens 31. The other beams of light 17a, 17b, 17d and 17e are masked from film 26 by members 29 and 30. As mirror 15 rotates in one direction or the other under the action of current flow through coil 13, the different beams of light are successively projected through opening 28 onto film 26, each beam impinging on the film through opening 28 just as the adjacent beam is clipped or cut off by masking member 29 or 30.

The sensitivity of the galvanometer may be adjusted so that the maximum amplitude of the seismic detector signal produces a deflection of mirror 15 which will cause one or the other of the outside light beams, 17a or 17e, to fully trace out this peak amplitude. Alternatively, the adjustment of the galvanometer may be such that it slightly over-modulates on the maximum amplitude portions of the signals so that these portions are effectively clipped from the record.

The operation of the embodiment illustrated in Fig. 1 may be more apparent from a study of the curves of Fig. 2A and 2B. In Fig. 2A, curve 35 corresponds to a representative seismic detector signal which is to be displayed. The electrical energy corresponding to this signal is supplied from source 11 through amplifier 12 to coil 13 of the galvanometer to deflect mirror 15 in accordance therewith. Fig. 2B illustrates the type of record produced on film 26 in response to a signal corresponding to curve 35 and utilizing the five-image display illustrated in Fig. 1. Starting at time $T_0$ in curve 35, where the seismic detector signal has zero amplitude, mirror 15 is in its intermediate position to position beam 17c in the center of opening 28 and to mask the other beams.

As the amplitude of curve 35 increases in a negative direction from time $T_0$, mirror 15 rotates to cause beam 17c to trace out a portion identified as 17c in Fig. 2B. When curve 35 reaches a predetermined amplitude in a negative direction, beam 17c has reached its maximum excursion in the negative direction and is cut off by masking plate 30 to abruptly terminate this beam. Simultaneously therewith, the adjacent beam 17b leaves upper masking plate 29 and enters opening 28 to trace across the record the portion identified in Fig. 2B as 17b. In curves 2A and 2B, it is assumed that the amplitude of curve 35 at time $T_1$ corresponds to the maximum excursion of trace 17b, so that beam 17b just reaches the bottom of the track width when curve 35 reaches its maximum negative value for that cycle at $T_1$. Curve 35 thereupon becomes less negative, thus reversing the direction of rotation of mirror 15 and causing beam 17b to trace a return track across the width of the track.

When curve 35 has reached a predetermined negative value, which value in the illustrated case would be ⅔ of the distance from the negative maximum at $T_1$ to the zero axis, beam 17b has reached the limit of its upward excursion and is thereupon cut off by masking plate 29. Simultaneously therewith, beam 17c leaves masking plate 30 and enters opening 28 to commence tracing a track 17c. This tracing continues as curve 35 passes through zero and commences increasing in a positive direction. When curve 35 has increased to a predetermined positive value, beam 17c reaches the upward limit of its excursion across opening 28 and is cut off by masking plate 29. Simultaneously therewith beam 17d leaves masking plate 30 and enters opening 28 to begin tracing a track from bottom to top shown as 17d. Beam 17 traces out the signal as it increases to a positive maximum value for that cycle at $T_2$ and then starts to become less positive. Beam 17d continues to follow signal 35 and traces out a downward trace 17d until beam 17d has reached the limit of its downward excursion and is cut off by masking plate 30. Beam 17c thereupon leaves masking plate 29 and enters opening 28 to trace out the portion of curve 35 where it passes through zero and reaches a negative maximum at $T_3$ and then reverses to become less negative.

The operation thus continues in this manner to trace out curve 35 in the form of a plurality of traces, only one of the different beams impinging on film 26 at any time, and each of the beams impinging on film 26 immediately after the adjacent beam leaves the film.

The operation of the present invention on portions of the signal 35 having amplitudes exceeding the maximum excursion of the outside traces is illustrated in the portion of the seismic detector signal beginning at time $T_4$. At this point signal 35 is passing through zero and increasing in a positive direction, and beam 17c is accordingly tracing out a track corresponding to this portion of the signal. When beam 17c reaches its maximum upward excursion, it is blanked by masking plate 29, and beam 17d thereupon leaves masking plate 30 and enters opening 28 to trace out portion 17d. When beam 17d reaches its maximum excursion, beam 17e leaves masking plate 30 and enters opening 28 to trace out the portion identified by track 17e. In this instance the positive maximum value to which curve 35 is increasing from time $T_4$ exceeds the maximum excursion limit of beam 17e, so that the trace made by beam 17e is cut off before curve 35 reaches its positive maximum on this cycle.

During the time between this cut-off, the signal is effectively overmodulated so that no trace is presented on the record until curve 35 has passed through its positive maximum value and decreased again to the value corresponding to the maximum positive excursion of beam 17e. At this point beam 17e leaves masking plate 29 and traces out the downward track 17e. From this point onward, the operation is similar to that described above, except in other similar cases of overmodulation where the amplitude of the seismic detector signal exceeds the maximum limit of excursion of one or the other of the outside beams.

The effectiveness of the present invention in producing an amplification or telescoping of the seismic signal for large-amplitude signals can perhaps best be appreciated from a study of Fig. 2B corresponding to the time immediately after $T_4$. During this period the seismic detector signal 35 has only one trace, whereas in the record produced by the present invention, three traces are provided, i.e., the traces corresponding to beams 17c, 17d, and 17e, as signal 35 increases to its positive maximum value. Similarly, during the decrease of the signal from its positive maximum value following time $T_4$, the present invention provides three traces from beams 17c, 17d, and 17e, corresponding to the single trace of the original seismic signal. Thus, in effect, the present invention operates to increase the information density on the record without increasing the size of the presentation.

Fig. 3 illustrates diagrammatically apparatus for simultaneously producing a plurality of separate channels of seismic display in accordance with the method of the present invention.

In Fig. 3, a plurality of galvanometers, shown schematically as mirrors 15a, 15b, 15c, 15d, 15e, and 15f, are aligned with a corresponding plurality of shielding or masking channels 35a, 35b, 35c, 35e, and 35f. Each of the galvanometer mirrors 15a through 15f may be similar to mirror 15 in the embodiment of Fig. 1 and have associated therewith equipment similar to that shown in Fig. 1, so that each of the mirrors 15a through 15f has focused thereupon a plurality of beams of light corresponding to the number of different images desired for each channel.

Each of masking channels 35a through 35f is aligned with its corresponding galvanometer mirror 15a through 15f, so that only one image from each of the galvanometer mirrors is projected onto film 26 at any given instant, and with no overlap between adjacent channels. Masking channels 35a through 35f are preferably lined with a suitable light-absorbing material so that only light shining directly through these channels reaches film 26. Thus, a plurality of separate channels of seismic display in accordance with the present invention may be simultaneously produced to give a resultant record in which the alignment of common events in the different channels may be readily determined from a visual analysis of the multichannel display.

Although but a few embodiments of the present invention have been illustrated and described, it will be apparent to those skilled in the art that various changes and modifications may be made therein without departing from the spirit of the invention or the scope of the appended claim.

I claim:

Apparatus for displaying seismic data in the form of a seismic detector signal having an amplitude varying as a function of the strength of seismic energy reflected from subsurface earth formation reflectors comprising a galvanometer mirror deflectable in response to energization by said signal, a light source, means for condensing said light source in a first dimension to establish a narrow beam of light, said condensing means directing said light beam toward said galvanometer mirror, a stationary shutter between said light source and said mirror, said shutter having a plurality of equally spaced openings therethrough to separate said beam into a plurality of discrete parallel beams including a centermost beam and beams to both sides of center, a recording medium, said discrete beams being reflected by said galvanometer mirror in parallel paths in accordance with said signal and being directed toward said recording medium, a masking means between said mirror and said recording medium, an aperture in said masking means through which said reflected discrete beams may pass, said aperture being positioned with respect to said mirror so that said centermost beam passes through the center of said aperture when said galvanometer is in its unenergized position, and said aperture being dimensioned in the direction of deflection of said beams in accordance with the spacing of said shutter openings to pass only one of said discrete beams at a time whereby energization of said galvanometer initiates deflection of said mirror to produce separate traces on said recording medium as each of said discrete beams is individually passed through said aperture to said recording means.

References Cited in the file of this patent

UNITED STATES PATENTS

| | | |
|---|---|---|
| 2,258,700 | Doll | Oct. 14, 1941 |
| 2,726,131 | Skelton | Dec. 16, 1955 |